United States Patent
Shibata et al.

(10) Patent No.: US 6,518,355 B1
(45) Date of Patent: Feb. 11, 2003

(54) PRESSURE-SENSITIVE RUBBER ADHESIVE AND PRESSURE-SENSITIVE ADHESIVE SHEET MADE USING THE SAME

(75) Inventors: Kazuhiko Shibata, Osaka (JP); Yasuyuki Tanaka, Tokyo (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/720,194

(22) PCT Filed: Jun. 22, 1999

(86) PCT No.: PCT/JP99/03309

§ 371 (c)(1),
(2), (4) Date: Dec. 22, 2000

(87) PCT Pub. No.: WO99/67338

PCT Pub. Date: Dec. 29, 1999

(30) Foreign Application Priority Data

Jun. 23, 1998 (JP) ............................................. 10-193774

(51) Int. Cl.⁷ ......................... C09J 107/00; C09J 7/02; C09J 9/00; C09J 107/02
(52) U.S. Cl. ..................... 524/575.5; 524/925; 156/598
(58) Field of Search ............................. 524/575.5, 925; 156/598

(56) References Cited

U.S. PATENT DOCUMENTS 5,866,249 A * 2/1999 Yarusso et al. ............. 428/343
5,910,567 A * 6/1999 Tanaka et al. ......... 264/331.13

FOREIGN PATENT DOCUMENTS

| JP | 54-76633 | 6/1979 | ............. C09J/3/12 |
| JP | 55-84378 | 6/1980 | ............. C09J/3/12 |
| JP | 4-110377 | 4/1992 | ........... C09J/201/00 |
| JP | 8-81502 | 3/1996 | ............. C08C/1/00 |
| JP | 8-81503 | 3/1996 | ............. C08C/1/00 |
| JP | 9-217048 | 8/1997 | .......... C09J/107/00 |

* cited by examiner

Primary Examiner—David W. Wu
Assistant Examiner—Kelechi C. Egwim
(74) Attorney, Agent, or Firm—Sughrue Mion, PLLC

(57) ABSTRACT

A rubber-based pressure-sensitive adhesive which (i) contains as the main rubber component a natural rubber comprising, as the main component, fine particles having a particle diameter of 1 μm or smaller contained in a raw natural rubber latex, (ii) contains as the main rubber component a linear natural rubber polymer contained in a raw natural rubber latex, (iii) contains as the main rubber component a natural rubber having a weight-average molecular weight of from 100,000 to 1,000,000 contained in a raw natural rubber latex, (iv) contains as the main rubber component a natural rubber having a rupture strength of 0.5 MPa or lower in terms of green strength contained in a raw natural rubber latex, or (v) contains as the main rubber component a natural rubber contained in the serum obtained by centrifuging a raw natural rubber latex has excellent pressure-sensitive adhesive properties, does not substantially necessitate a mastication step, and can be easily produced with a small amount of energy in a short time.

2 Claims, No Drawings

PRESSURE-SENSITIVE RUBBER ADHESIVE AND PRESSURE-SENSITIVE ADHESIVE SHEET MADE USING THE SAME

TECHNICAL FIELD

The present invention relates to rubber-based pressure-sensitive adhesives and a pressure-sensitive adhesive sheet using the same. More particularly, the invention relates to natural-rubber-based pressure-sensitive adhesives and a pressure-sensitive adhesive sheet using the same.

BACKGROUND ART

In most processes for producing a natural-rubber-based pressure-sensitive adhesive, a mastication treatment for reducing the molecular weight of natural rubber has hitherto been conducted in order to improve the plasticity of the natural rubber and impart satisfactory pressure-sensitive adhesive properties to the pressure-sensitive adhesive. A natural rubber having low plasticity gives a pressure-sensitive adhesive composition solution which has a high solution viscosity and reduced applicability to substrates for pressure-sensitive adhesive tapes and which therefore is undesirable from the standpoints of environmental sanitation and safety such as the prevention of disasters because a large amount of an organic solvent is necessary for lowering the rubber concentration. Furthermore, a natural rubber having too high a molecular weight has reduced compatibility with tackifier resins and this inhibits impartation of pressure-sensitive adhesive properties or results in cases where the pressure-sensitive adhesive layer is too elastic to be suitable for use as a pressure-sensitive adhesive tape.

Although the mastication step is an indispensable step in the production of a natural-rubber-based pressure-sensitive adhesive as described above, it has been pointed out from long ago that mastication is accompanied by the wasteful use of time and energy whatever methods are used for mastication. For example, the mechanical mastication in which natural rubber is kneaded by applying mechanical force thereto with a two-roll mill, Banbury mixer, or the like necessitates a large amount of energy. On the other hand, the chemical mastication which is conducted by adding a peroxide or the like to a solution or latex containing natural rubber necessitates much time. In these mastications, a compound called a peptizing agent, represented by a thiuram type, mercaptan type, or disulfide type compound, a zinc compound thereof, or the like, or a phthalocyanine/iron catalyst or the like as a catalyst for mastication is generally added. Such additives not only cause the rubber to emit an odor and discolor but also may foul the adherend when the rubber is used as a pressure-sensitive adhesive tape. Because of this, the rubber has limited uses as pressure-sensitive adhesive tapes. Consequently, if the addition of a peptizing agent or the like becomes unnecessary, the rubber is expected to be used in a wider range of applications.

As described above, to omit or shorten the mastication step in the production of a natural-rubber-based pressure-sensitive adhesive and a pressure-sensitive adhesive sheet using the same has been a major subject which should be investigated for a drastic improvement for establishing a more efficient production process.

Accordingly, an object of the invention is to provide a rubber-based pressure-sensitive adhesive which has excellent pressure-sensitive adhesive properties, does not substantially necessitate a mastication step, and can be easily produced with a small amount of energy in a short time, and to provide a pressure-sensitive adhesive sheet using the same.

DISCLOSURE OF THE INVENTION

The present inventors made intensive investigations in order to accomplish the object. Through these investigations, they have found that fine particles having a particle diameter of 1 μm or smaller are present in the serum obtained in condensing and purifying a raw natural rubber latex with a continuous centrifugal separator, that the rubber (skim rubber) constituting these fine particles is a linear polymer having a low molecular weight, and that when this rubber is used as the rubber ingredient of a rubber-based pressure-sensitive adhesive, not only the mastication step can be substantially omitted but excellent pressure-sensitive adhesive properties are obtained. The invention has thus been completed.

Namely, the invention provides a rubber-based pressure-sensitive adhesive which contains as the main rubber component a natural rubber comprising, as the main component, fine particles having a particle diameter of 1 μm or smaller contained in a raw natural rubber latex.

The invention further provides a rubber-based pressure-sensitive adhesive which contains as the main rubber component a linear natural rubber polymer contained in a raw natural rubber latex.

The invention furthermore provides a rubber-based pressure-sensitive adhesive which contains as the main rubber component a natural rubber having a weight-average molecular weight of from 100,000 to 1,000,000 contained in a raw natural rubber latex.

The invention still further provides a rubber-based pressure-sensitive adhesive which contains as the main rubber component a natural rubber having a rupture strength of 0.5 MPa or lower in terms of green strength contained in a raw natural rubber latex.

The invention still further provides a rubber-based pressure-sensitive adhesive which contains as the main rubber component a natural rubber contained in the serum obtained by centrifuging a raw natural rubber latex.

The pressure-sensitive adhesive sheet of the invention has a pressure-sensitive adhesive layer constituted of any of the rubber-based pressure-sensitive adhesives described above on at least one side of a substrate.

BEST MODE FOR CARRYING OUT THE INVENTION

The feature of a rubber-based pressure-sensitive adhesive of the invention resides in that it contains as the main rubber component a natural rubber comprising, as the main component, fine particles having a particle diameter of 1 μm or smaller contained in a raw natural rubber latex.

The particle diameters of the fine particles are, for example, about from 0.001 to 1 μm, preferably about from 0.05 to 0.8 μm. The proportion of the natural rubber constituting the fine particles in the main rubber ingredient of the rubber-based pressure-sensitive adhesive is, for example, 50% by weight or higher, preferably 70% by weight or higher, more preferably 80% by weight or higher, most preferably 90% by weight or higher, based on the weight of the main rubber ingredient. Consequently, a natural rubber latex or the like having a particle diameter exceeding 1 μm can be incorporated into the main rubber ingredient.

Methods for preparing the fine particles are not particularly limited. However, the most general methods include a technique in which particles having a large particle diameter are removed from a raw natural rubber latex by the sedimentation method to obtain fine particles having a desired particle diameter. The sedimentation method includes, for example, the technique in which a centrifugal separator is used to utilize interaction between particle diameter and centrifugal force.

The natural rubber comprising, as the main component, fine particles having a particle diameter of 1 μm or smaller has a lower molecular weight than the natural rubber conventionally used as a raw material for rubber-based pressure-sensitive adhesives and, in addition, is characterized by consisting mainly of a linear polymer unlike the natural rubber which has been conventionally used. More specifically, the natural rubber which has been conventionally used has a weight-average molecular weight as determined by GPC of about 2,000,000, whereas the natural rubber constituting the fine particles has a weight-average molecular weight of about from 100,000 to 1,000,000, preferably from 200,000 to 1,000,000, more preferably about from 500,000 to 800,000. It is presumed that these fine particles correspond to a product yielded at the initial stage of the biosynthesis of high-molecular rubber in natural rubber trees and, hence, have a low molecular weight and a linear structure in which the amount of abnormal groups contained in the polymer chain is small. Because this natural rubber has such a structure, it is far lower than the ordinary natural rubber in the strength of raw rubber itself, i.e., the uncrosslinked/unvulcanized-state strength or the strength generally called green strength. This strength thereof in terms of rupture strength is as low as 0.5 MPa or lower, in contrast to the strength of the ordinary natural rubber which is at least 5 MPa or higher.

Since the rubber-based pressure-sensitive adhesive of the invention contains the specific natural rubber described above as the main rubber component, there is no need of conducting the mastication step which has conventionally been conducted for molecular weight reduction or, even when the step is conducted, the conventionally required energy and time can be reduced to one third or less. Consequently, in the production of a pressure-sensitive adhesive, not only energy consumption can be significantly reduced but the number of steps can be reduced and, hence, the production efficiency also can be greatly improved. Thus, the production steps can be drastically changed. Furthermore, since this natural rubber comprises a linear polymer as the main component, it gives a natural-rubber solution (or dispersion) which has a lower solution (or dispersion) viscosity and better applicability as compared with solutions (or dispersions) of conventional masticated rubbers having the same concentration and the same weight-average molecular weight. This natural rubber has another advantage that the solution (or dispersion) can have a higher concentration when the viscosity is the same. Moreover, the rubber-based pressure-sensitive adhesive of the invention has excellent pressure-sensitive adhesive properties comparable to those of pressure-sensitive adhesives using a conventional masticated natural rubber.

As apparent from the above, the invention includes a rubber-based pressure-sensitive adhesive which contains as the main rubber component a linear natural rubber polymer contained in a raw natural rubber latex. The proportion of the linear natural rubber polymer in the rubber ingredient of the rubber-based pressure-sensitive adhesive is, for example, 50% by weight or higher, preferably 70% by weight or higher, more preferably 80% by weight or higher, most preferably 90% by weight or higher, based on the weight of the rubber ingredient. The rubber-based pressure-sensitive adhesive may contain a branched natural rubber polymer or the like as a rubber component. Incidentally, qualitative and quantitative analyses of the linear natural rubber polymer can be conducted by NMR spectrometry, with an osmometer or viscometer, through determination of the amount of a bonded fatty acid, etc.

The invention further includes a rubber-based pressure-sensitive adhesive which contains as the main rubber component a natural rubber having a weight-average molecular weight of from 100,000 to 1,000,000 contained in a natural rubber latex. The weight-average molecular weight is preferably about from 200,000 to 1,000,000, more preferably about from 500,000 to 800,000. Weight-average molecular weight can be determined by GPC. A natural rubber having a molecular weight exceeding 1,000,000 or the like can be incorporated in an appropriate amount into the rubber-based pressure-sensitive adhesive.

The invention furthermore includes a rubber-based pressure-sensitive adhesive which contains as the main rubber component a natural rubber having a rupture strength of 0.5 MPa or lower in terms of green strength contained in a raw natural rubber latex. The rupture strength in terms of green strength is preferably about from 0.01 to 0.5 MPa, more preferably about from 0.1 to 0.5 MPa.

The invention furthermore includes a rubber-based pressure-sensitive adhesive which contains as the main rubber component a natural rubber (skim rubber) contained in the serum obtained by centrifuging a raw natural rubber latex. The proportion of the skim rubber in the rubber ingredient of the rubber-based pressure-sensitive adhesive is, for example, 50% by weight or higher, preferably 70% by weight or higher, more preferably 80% by weight or higher, most preferably 90% by weight or higher, based on the weight of the rubber ingredient.

In the rubber-based pressure-sensitive adhesives of the invention, the form of the natural rubber incorporated therein is not particularly limited. The rubber may have been incorporated in any form such as, e.g., the form of a latex, a solution (or dispersion) in an organic solvent, a solid capable of being reduced in viscosity by heating, etc.

A typical rubber-based pressure-sensitive adhesive according to the invention is constituted mainly of the natural rubber and a tackifier (tackifier resin). In preparing the pressure-sensitive adhesive, suitable additives are further added, such as a softener, plasticizer, antioxidant, filler, and colorant (pigment or the like), according to need. The form in which these additives are added to the natural rubber is not particularly limited. Although the form thereof depends also on the form of the natural rubber, it may be an emulsion, an organic solution, or a liquid or another dispersion.

Examples of the tackifier resin include rosin type resins such as rosin esters, hydrogenated rosin esters, disproportionated rosin esters, and polymerized rosin esters; coumarone-indene type resins such as coumarone-indene resins, hydrogenated coumarone-indene resins, phenol-modified coumarone-indene resins, and epoxy-modified coumarone-indene resins; and petroleum resins such as polyterpene resins, styrene-modified terpene resins, phenol-modified terpene resins, aliphatic petroleum resins, aromatic petroleum resins, aromatic-modified aliphatic petroleum resins, and purely-aromatic-monomer resins. These can be used alone or in combination of two or more thereof. The incorporation amount of the tackifier is generally about from 10 to 200 parts by weight per 100 parts by weight of the natural rubber, but should not be construed as being limited thereto. Incidentally, the incorporation amount of other additives is usually about from 0.3 to 50 parts by weight per 100 parts by weight of the natural rubber, but should not be construed as being limited thereto.

The pressure-sensitive adhesive sheet of the invention has a pressure-sensitive adhesive layer constituted of the rubber-based pressure-sensitive adhesive of the invention on at least one side of a substrate.

As the substrate can be used a suitable one such as, e.g., a plastic film, paper, non-woven fabric, foam, or metal foil. The pressure-sensitive adhesive layer may have been fixed to the substrate or may have been formed so as to be strippable from the substrate. A pressure-sensitive adhesive tape having a pressure-sensitive adhesive layer strippable from the substrate is obtained, for example, by treating a surface of a substrate with a release agent and forming a pressure-sensitive adhesive layer thereon. The pressure-sensitive adhesive layer can have a suitable thickness within a range in which handleability, etc. are not impaired. However, the thickness thereof is generally about from 1 to 500 µm.

For producing the pressure-sensitive adhesive sheet of the invention, an ordinary process for producing a pressure-sensitive adhesive sheet can be used. For example, the pressure-sensitive adhesive sheet can be produced by a method in which a rubber-based pressure-sensitive adhesive composition containing the specific natural rubber is applied to a substrate with a coating apparatus such as a roll coater, reverse coater, gravure coater, or bar coater and dried, or by a transfer technique in which the composition is applied to a release liner, dried, and then transferred to a substrate. The pressure-sensitive adhesive sheet of the invention may be slit into an appropriate width and wound into a roll, whereby the sheet can be used as a pressure-sensitive adhesive tape.

The invention will be explained below in more detail based on Examples, but the invention should not be construed as being limited by these Examples.

EXAMPLE 1

A natural-rubber-based pressure-sensitive adhesive composition was prepared which was constituted of 100 parts by weight of an untreated natural rubber (skim rubber; weight-average molecular weight, about 700,000 to 800,000; linear-polymer content, about 98% by weight; rupture strength in terms of green strength, 0.42 MPa) obtained from a fine-particle latex having a particle diameter of about from 0.1 to 0.8 µm, 100 parts by weight of a terpene type tackifier resin having a softening point of 100° C., 1 part by weight of an antioxidant, and 300 parts by weight of toluene. This composition was applied to a PET (poly(ethylene terephthalate)) film having a thickness of 25 µm and dried at 70° C. for 8 minutes to obtain a pressure-sensitive adhesive tape having a pressure-sensitive adhesive layer with a thickness of 30 µm.

Incidentally, green strength was measured in the following manner. The natural rubber was formed into a film having a thickness of 0.4 mm, and this film was punched with a dumbbell die to produce a sample having a curved-part width of 5 mm and a length of 5 cm. This sample was held at a chuck-to-chuck distance of 2 cm and pulled at a pulling rate of 500 mm/min to determine the strength at rupture. This strength was converted using the sectional area and expressed in the unit MPa.

EXAMPLE 2

An emulsion obtained by adding 100 parts by weight of a terpene type tackifier resin having a softening point of 100° C., 1 part by weight of an antioxidant, and 100 parts by weight of toluene to 140 parts by weight of water which contained 2 parts by weight of a nonionic surfactant and stirring the mixture was mixed with 100 parts by weight of a fine-particle natural rubber latex having a particle diameter of about from 0.1 to 0.8 µm obtained as a serum from a natural rubber latex with a continuous centrifugal separator. Thus, a natural-rubber-based pressure-sensitive adhesive composition was prepared. This composition was applied to a PET film having a thickness of 25 µm and dried at 130° C. for 5 minutes to obtain a pressure-sensitive adhesive tape having a pressure-sensitive adhesive layer with a thickness of 30 µm. Incidentally, in the fine-particle natural rubber latex, the rubber constituting the fine particles had a weight-average molecular weight of about from 700,000 to 800,000 and this rubber had a linear-polymer content of about 98% by weight.

EXAMPLE 3

A natural-rubber-based pressure-sensitive adhesive composition was prepared which was constituted of 100 parts by weight of an untreated natural rubber (weight-average molecular weight, 480,000; linear-polymer content, 99% by weight; rupture strength in terms of green strength, 0.17 MPa) obtained from a fine-particle latex having an average particle diameter of 0.15 µm, 100 parts by weight of a terpene type tackifier resin having a softening point of 100° C., 1 part by weight of an antioxidant, and 300 parts by weight of toluene. This composition was applied to a PET film having a thickness of 25 µm and dried at 70° C. for 8 minutes to obtain a pressure-sensitive adhesive tape having a pressure-sensitive adhesive layer with a thickness of 30 µm.

Comparative Example 1

A natural-rubber-based pressure-sensitive adhesive composition was prepared which was constituted of 100 parts by weight of a natural rubber, 100 parts by weight of a terpene type tackifier resin having a softening point of 100° C., 1 part by weight of an antioxidant, and 800 parts by weight of toluene. This composition was applied to a PET film having a thickness of 25 µm and dried at 70° C. for 8 minutes to obtain a pressure-sensitive adhesive tape having a pressure-sensitive adhesive layer with a thickness of 30 µm.

Comparative Example 2

A natural-rubber-based pressure-sensitive adhesive composition was prepared which was constituted of 100 parts by weight of a natural rubber which had been masticated by adding 0.5 parts by weight of pentachlorothiophenol and passing the mixture through a two-roll mill twelve times, 100 parts by weight of a terpene type tackifier resin having a softening point of 100° C., 1 part by weight of an antioxidant, and 300 parts by weight of toluene. This composition was applied to a PET film having a thickness of 25 µm and dried at 70° C. for 8 minutes to obtain a pressure-sensitive adhesive tape having a pressure-sensitive adhesive layer with a thickness of 30 µm.

Comparative Example 3

An emulsion obtained by adding 100 parts by weight of a terpene type tackifier resin having a softening point of 100° C., 1 part by weight of an antioxidant, and 100 parts by weight of toluene to 140 parts by weight of water which contained 2 parts by weight of a nonionic surfactant and stirring the mixture was mixed with 100 parts by weight of a natural rubber latex to prepare a natural-rubber-based pressure-sensitive adhesive composition. This composition was applied to a PET film having a thickness of 25 μm and dried at 130° C. for 5 minutes to obtain a pressure-sensitive adhesive tape having a pressure-sensitive adhesive layer with a thickness of 30 μm.

Comparative Example 4

One part by weight of benzoyl peroxide was added to 100 parts by weight of a natural rubber latex, and this mixture was stirred with heating at 70° C. for 5 hours while bubbling oxygen thereinto to conduct a mastication treatment. Hundred parts by weight of this masticated natural rubber latex was mixed with an emulsion obtained by adding 100 parts by weight of a terpene type tackifier resin having a softening point of 100° C., 1 part by weight of an antioxidant, and 100 parts by weight of toluene to 140 parts by weight of water which contained 2 parts by weight of a nonionic surfactant and stirring the mixture. Thus, a natural-rubber-based pressure-sensitive adhesive composition was prepared. This composition was applied to a PET film having a thickness of 25 μm and dried at 130° C. for 5 minutes to obtain a pressure-sensitive adhesive tape having a pressure-sensitive adhesive layer with a thickness of 30 μm.

Comparative Evaluation

The pressure-sensitive adhesive tapes obtained in the Examples and Comparative Examples were subjected to the following comparative evaluation.

Adhesive Strength:

To a 2 mm-thick copper plate whose surface had been polished with a #280 water-resistant abrasive paper was applied a 2.0 mm-wide pressure-sensitive adhesive tape by pressing the tape by rolling a 2-kg rubber roller forward and backward once thereon. After the lapse of 30 minutes, the 180-degree peel strength (pulling rate, 300 mm/min) was measured under the conditions of 23° C./65% RH. This strength was taken as adhesive strength.

Temporal Loss:

The cases in which mastication resulted in a temporal loss of 5 hours or longer were rated as ×, while the cases in which mastication did not result in such temporal loss were rated as ○.

Energy Loss:

The cases in which mastication necessitated much energy (resulted in an energy loss) were rated as ×, while the cases in which mastication did not necessitate much energy were rated as ○.

The results are shown in Table 1.

TABLE 1

|  | Adhesive strength (gf/20 mm) | Temporal loss | Energy loss |
|---|---|---|---|
| Example 1 | 702 | ○ | ○ |
| Example 2 | 650 | ○ | ○ |
| Example 3 | 1040 | ○ | ○ |
| Comparative Example 1 | 503 | ○ | ○ |
| Comparative Example 2 | 712 | × | × |
| Comparative Example 3 | 435 | ○ | ○ |
| Comparative Example 4 | 632 | × | × |

As apparent from Table 1, the pressure-sensitive adhesive tapes of the Examples were excellent in both of pressure-sensitive adhesive properties and production efficiency.

INDUSTRIAL APPLICABILITY

According to the rubber-based pressure-sensitive adhesives and pressure-sensitive adhesive sheet of the invention, a mastication step can be substantially omitted because of the use of a specific natural rubber and they not only can be easily produced with a small amount of energy in a short time but have satisfactory pressure-sensitive adhesive properties.

What is claimed is:

1. A rubber-based pressure-sensitive adhesive which contains as the main rubber component a natural rubber contained in the serum obtained by centrifuging a raw natural rubber latex.

2. The rubber-based pressure-sensitive adhesive of claim 1, which further contains a tackifier resin.

* * * * *